(12) United States Patent
    Perrin

(10) Patent No.: US 10,130,174 B2
(45) Date of Patent: Nov. 20, 2018

(54) INTERLOCKING STABILIZING DEVICE

(71) Applicant: Denis Perrin, Wilton Manors, FL (US)

(72) Inventor: Denis Perrin, Wilton Manors, FL (US)

(73) Assignee: Rketype Solutions Inc., Wilton Manors, FL (US)

( * ) Notice: Subject to any disclaimer, the term of this patent is extended or adjusted under 35 U.S.C. 154(b) by 0 days.

(21) Appl. No.: 15/134,241

(22) Filed: May 6, 2016

(65) Prior Publication Data

US 2016/0309895 A1    Oct. 27, 2016

Related U.S. Application Data

(63) Continuation of application No. 14/685,935, filed on Apr. 14, 2015.

(60) Provisional application No. 61/979,859, filed on Apr. 15, 2014.

(51) Int. Cl.
    *A47B 91/02*    (2006.01)
    *A47B 91/12*    (2006.01)
    *F16B 13/08*    (2006.01)
    *B23Q 3/10*    (2006.01)
    *B23Q 1/58*    (2006.01)
    *F16M 7/00*    (2006.01)

(52) U.S. Cl.
    CPC .............. *A47B 91/02* (2013.01); *A47B 91/12* (2013.01); *B23Q 1/58* (2013.01); *B23Q 3/10* (2013.01); *F16B 13/0891* (2013.01); *F16M 7/00* (2013.01); *B23Q 2703/12* (2013.01)

(58) Field of Classification Search
    CPC ......... F16B 13/0891; B23Q 1/58; B23Q 3/10; B23Q 2703/12; Y10T 403/32426; Y10T 403/32451; Y10T 403/32434; A47B 91/02; A47B 91/12; F16M 7/00
    USPC ....... 248/125.2, 222.13, 188.1, 188.2, 188.4, 248/188.5, 668, 223.41, 224.51, 224.61, 248/223.21, 225.11, 225.21, 118.3, 124.1, 248/125.1, 295.11, 298.1, 346.07; 52/126.1, 125.5; 269/104; 16/82
    See application file for complete search history.

(56) References Cited

U.S. PATENT DOCUMENTS

| | | | | |
|---|---|---|---|---|
| 1,901,287 A | * | 3/1933 | Corriveau | B60G 11/113 254/104 |
| 2,539,703 A | * | 1/1951 | Sato | E04G 25/00 248/357 |
| 2,760,223 A | * | 8/1956 | Walz | E05F 5/025 16/86 A |
| 2,819,037 A | * | 1/1958 | Wilkin | B23Q 1/58 248/188.2 |
| 3,030,730 A | * | 4/1962 | Costar | A47B 91/02 248/188.2 |
| 3,094,258 A | * | 6/1963 | Punke | A47G 19/08 211/71.01 |

(Continued)

FOREIGN PATENT DOCUMENTS

GB    2404388 A  *  2/2005

*Primary Examiner* — Kimberly T Wood
(74) *Attorney, Agent, or Firm* — Indrajana Law Group, a PLC

(57) ABSTRACT

A stabilization device comprising of two identical pieces is disclosed. The pieces can be used individually as stabilizing shims, or it can be interlocked with one another such that it creates an adjustable stabilizer that can be reused again. The piece comprises of an external surface, an internal surface, an interlocking channel within the internal surface, and an interlocking guide that can be inserted into said interlocking channel.

8 Claims, 7 Drawing Sheets

(56) References Cited

U.S. PATENT DOCUMENTS

| | | | | |
|---|---|---|---|---|
| 3,171,632 A * | 3/1965 | Jines | F16M 7/00 254/104 |
| 3,404,501 A * | 10/1968 | Von Wedel | E06B 3/5409 52/126.4 |
| 3,706,112 A * | 12/1972 | Newell | E05C 17/54 16/82 |
| 3,836,118 A * | 9/1974 | Meyer | E06B 3/5409 254/104 |
| 4,135,335 A * | 1/1979 | Jensen | E04G 25/00 248/188.2 |
| 4,281,739 A * | 8/1981 | Keiser | B66B 11/004 181/207 |
| 4,586,727 A * | 5/1986 | Andrieu | A63C 9/005 248/188.2 |
| 4,625,489 A * | 12/1986 | Bogle | F16B 2/14 254/104 |
| 4,776,548 A * | 10/1988 | Bezenek | B60T 3/00 248/188.2 |
| 4,830,320 A * | 5/1989 | Bellows | F16M 7/00 248/188.2 |
| 5,249,767 A * | 10/1993 | Mellen | F16M 7/00 248/188.2 |
| 5,492,292 A * | 2/1996 | Richards | F16M 7/00 248/188.2 |
| 6,805,327 B1 * | 10/2004 | Shen | A47B 91/02 248/346.07 |
| 7,357,364 B2 * | 4/2008 | Jackson | A47F 5/0846 248/309.1 |
| 7,690,080 B1 * | 4/2010 | Coffman, II | E05C 17/54 16/82 |
| 7,703,727 B2 * | 4/2010 | Selness | A47B 91/028 248/125.2 |
| 7,784,751 B1 * | 8/2010 | Bellows | A47B 91/00 248/188.2 |
| 8,136,308 B2 * | 3/2012 | Slott | E04B 5/12 248/188.2 |
| 8,317,025 B1 * | 11/2012 | Kolozs | F42B 39/22 206/521 |
| 8,462,075 B2 * | 6/2013 | Lettkeman | F16M 11/04 343/878 |
| 8,833,720 B2 * | 9/2014 | Liu | A47B 45/00 248/346.07 |

\* cited by examiner

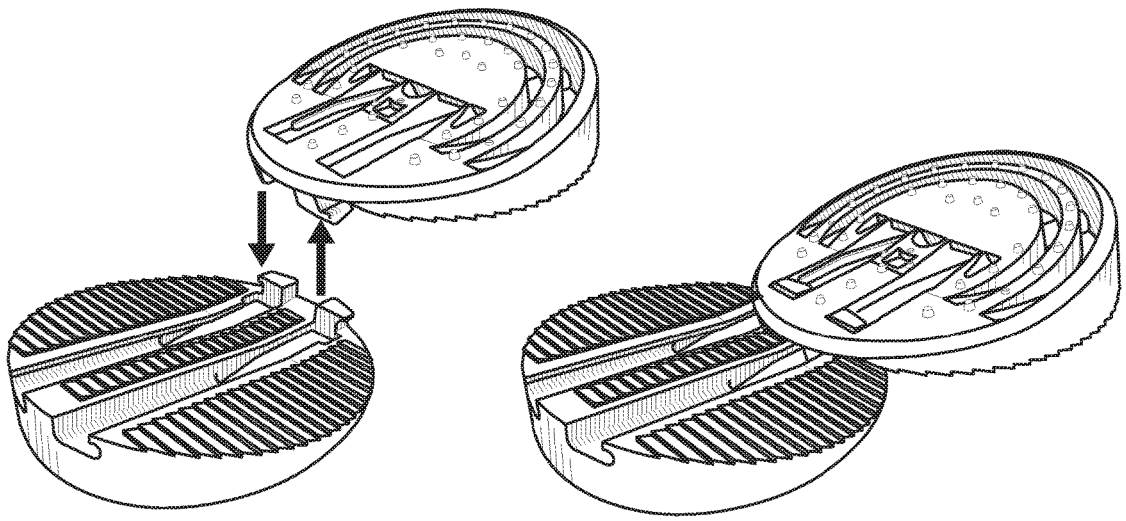
FIG. 07A          FIG. 07B
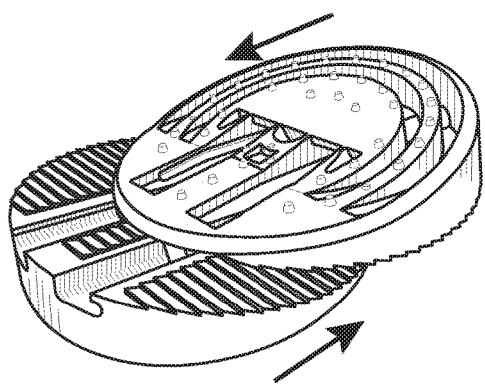   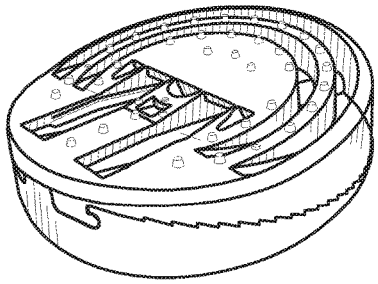
FIG. 07C          FIG. 07D
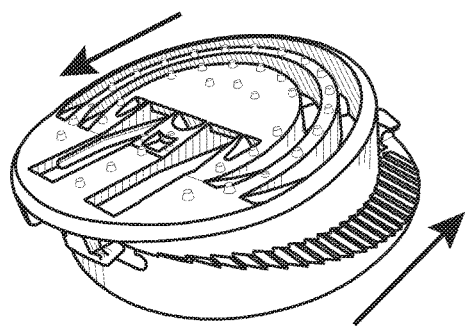
FIG. 07E

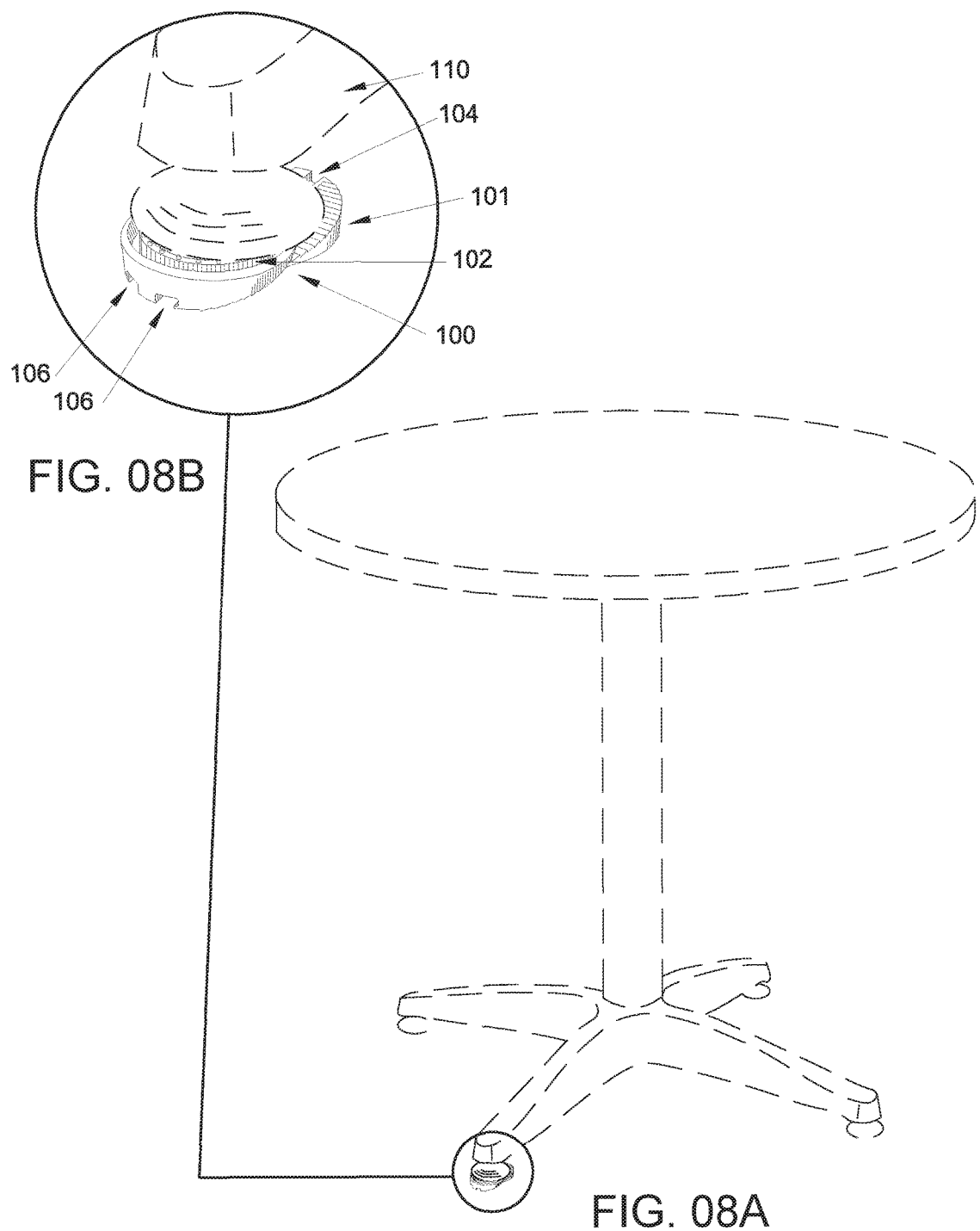

INTERLOCKING STABILIZING DEVICE

CROSS REFERENCE TO RELATED APPLICATIONS

This Application claims priority to the U.S. Provisional Application No. 61/979,859, filed on Apr. 15, 2014, and non-provisional application Ser. No. 14/685,935 filed on Apr. 14, 2015. Both applications are hereby incorporated by reference.

STATEMENT REGARDING FEDERALLY SPONSORED RESEARCH AND DEVELOPMENT

None.

FIELD OF THE INVENTION

The field of the present invention is directed to the leveling and stabilizing of articles, such as furniture and the like, which rest on a support surface, such as a floor, in order to prevent wobbling, tipping, or vibration during use on mostly even and on somewhat uneven surfaces.

BACKGROUND

Most articles of furniture are constructed to have a lower support structure, which defines a support plane at its lower most point. The operative or working areas of the article of furniture are then oriented in a desired manner with respect to that support plane by the support structure. For example, a typical table has a surface to support objects, which is oriented parallel to the floor and supported by a plurality of legs perpendicular to the table surface. Thus, the support plane of this table is defined by the free ends of the legs. However, planar geometry dictates that only three operative support points define a plane. Thus, it is necessary that the table legs be sized with great care in order to ensure that all four free ends terminate in a common plane; otherwise, the table will be unstable. When this happens, the article does not have a single stable support plane but rather is subject to unwanted wobbling, tipping, or as in the case of machinery—vibrating. Even articles, which have only three support points, such as a three-legged table, that automatically define a stable support plane, can still have the problem that the working surface may not be in the desired orientation due to any error in the intended length of any support. It is also important to consider surfaces that are uneven. Even with the legs sized appropriately, the article may still rock.

Other articles that have rotating components, such as pumps, air-conditioners, fans, and the like, can vibrate if not properly leveled and stabilized. For example, an air-handling unit might include a fan. If the fan is not perfectly balanced, then any instability in the support of the air-handling unit on its support surface might allow the unit to vibrate. In some cases, this vibration can be sufficient to cause damage to the unit, and often times produce unwanted noise.

Another common scenario for unstable pieces of furniture occurs in the food service setting, especially in locations where restaurants often move around chairs and table to accommodate various number of guests on a given table. In situations where dining table settings get moved around on a daily basis, such as garden or side of the street establishments, it is very common to encounter different sized gaps that a single sized stabilizer will not be enough to fully stabilize the piece of the furniture with the uneven ground. Even if a table theoretically can be stabilized on a particular location, the stability might easily be lost if the table were moved to a different location because the host requires a larger seating for a party, or the tables are removed from the spot for cleaning purposes on both even and uneven surfaces.

SUMMARY

The present invention is directed to a stabilizing device comprising of two identical pieces that can either be used individually or interlocked with one another in order to achieve a stable position on a given surface and an article that needs to be supported.

Each individual piece comprises of an external gripping surface, an internal surface, where said internal surface further comprise of at least one interlocking channel, at least one interlocking guide, and an interlocking height adjustment steps that becomes substantially more rigid or locked as weight is applied to the device. Thus reducing slippage both between the interlocking devices and the surface and the furniture. A user simply inserts the interlocking guide into the opening on the opposing piece's interlocking channel(s), and by doing so the external surfaces of the pieces will respectively grip the bottom surface of the article that needs to be supported and the surface of the ground without slipping.

To adjust the height of the stabilizer, the user can simply pinch the pieces together. As the user applies force to the pieces, both pieces move along the interlocking channel(s), one step at a time along the height adjustable step until the desired height is achieved.

The stabilizer is designed to be reusable, and the shape of the stabilizing pieces allow commercial logos to be adorned on said pieces. The stabilizer can then in turn be distributed to the patrons of a commercial food establishment, either as a practical stabilizing tool or as a souvenir that has advertising purposes for the business owner or both.

BRIEF DESCRIPTION OF DRAWINGS

These and other features, aspects, and advantages of the present invention will become better understood with regard to the following descriptions, appended claims and accompanying drawings where:

FIGS. 07A, 07B, 071C, 07D, 07E show a series of views of the preferred embodiment of the interlocking stabilization device in different height settings;

FIG. 08A shows a perspective view of the preferred embodiment of the stabilization device supporting a furniture leg.

FIG. 08B shows the close up view of the preferred embodiment of the stabilization device supporting a furniture leg.

REFERENCE NUMBER INDEX

100 Stabilization Device
101 Stabilization Piece
102 External Gripping Surface
103 Internal Surface
104 Interlocking Channel(s)
105 Interlocking Channel(s) insertion point
106 Interlocking Channel(s) exit point
107 Interlocking Guide(s)
108 Stepped Ramp
109 Commercial Logo Placement
110 Furniture Leg
111 External Groove

DETAILED DESCRIPTION OF THE PREFERRED EMBODIMENT

Figure 1:
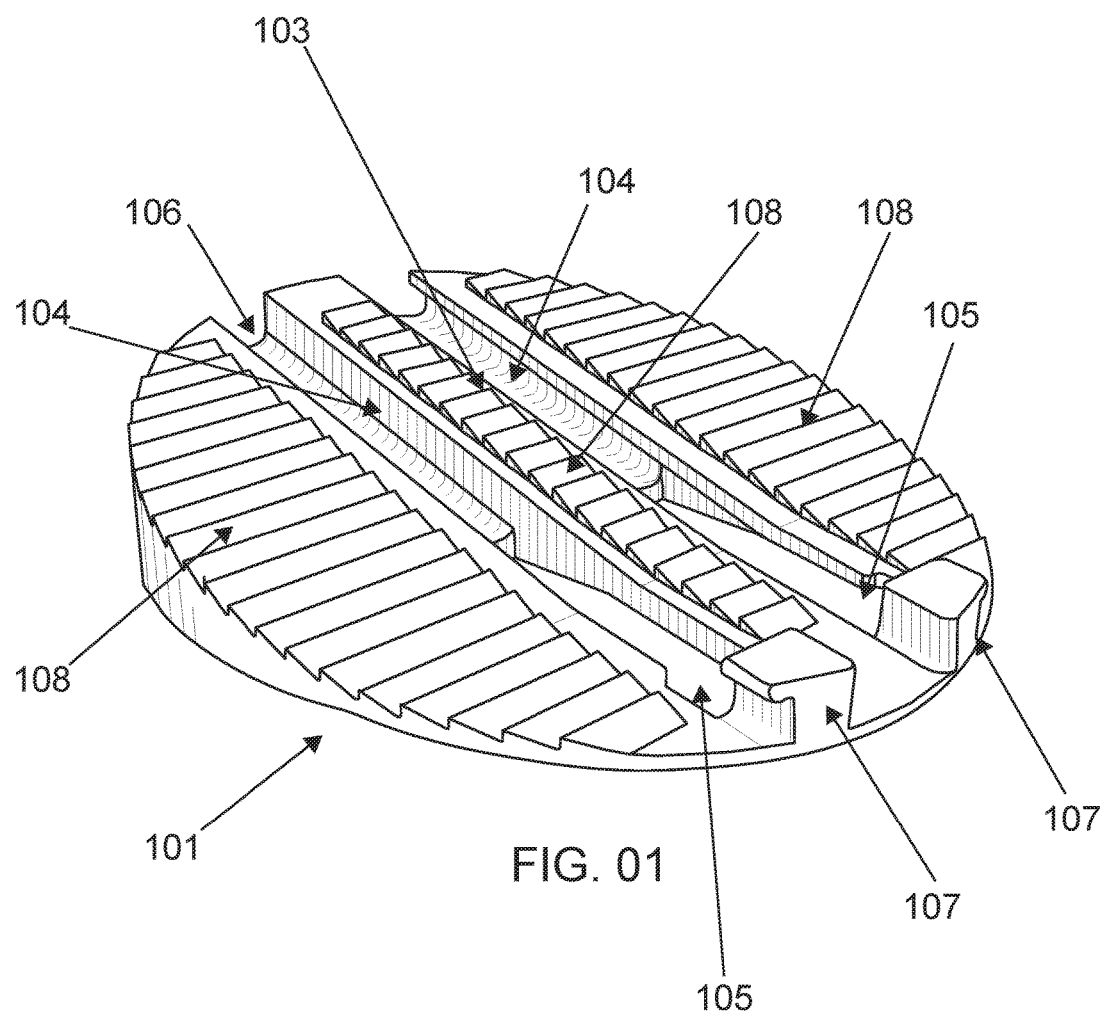
FIG. 01 shows a perspective view of the preferred embodiment of the stabilization piece, showing the internal surface of the stabilization piece.
Figure 2:
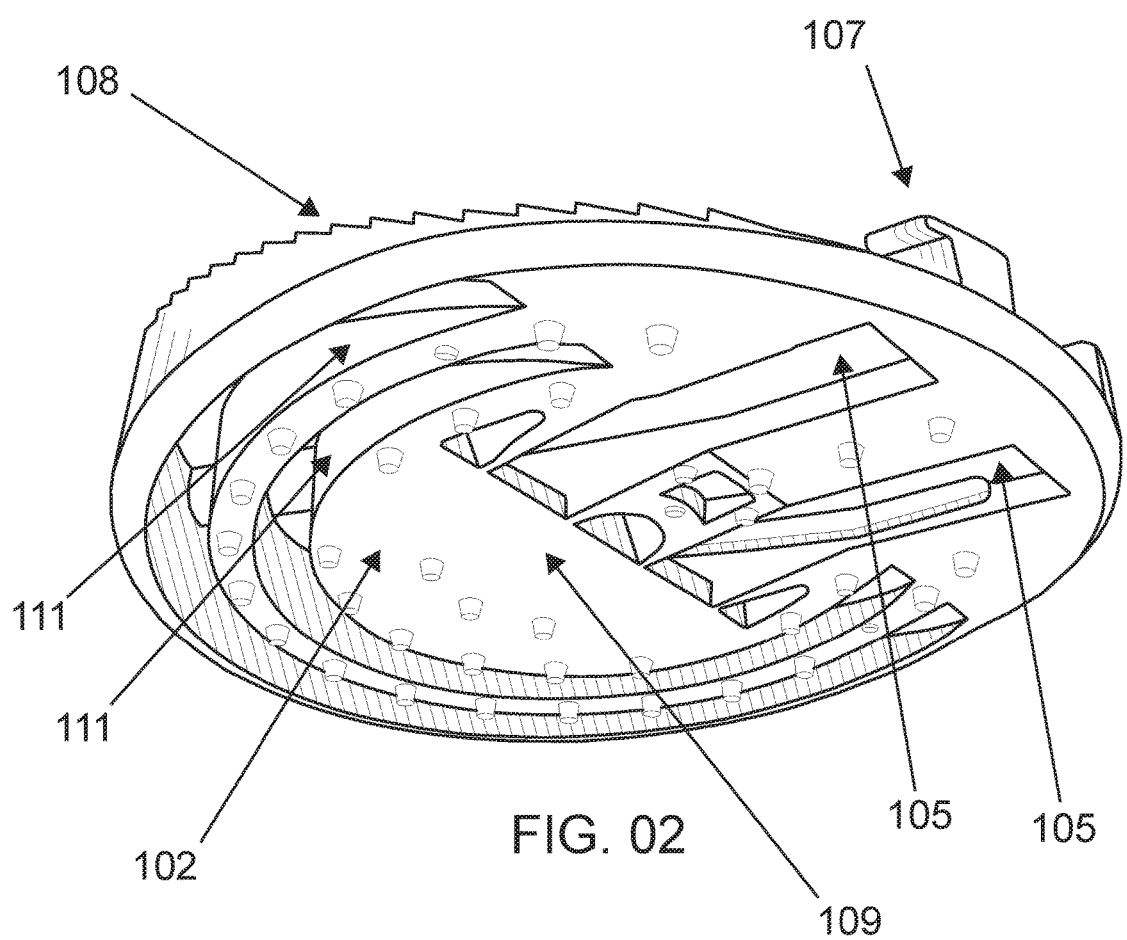
FIG. 02 shows a perspective view of the preferred embodiment of the stabilization piece, showing the external surface of the stabilization piece.
Figure 3:
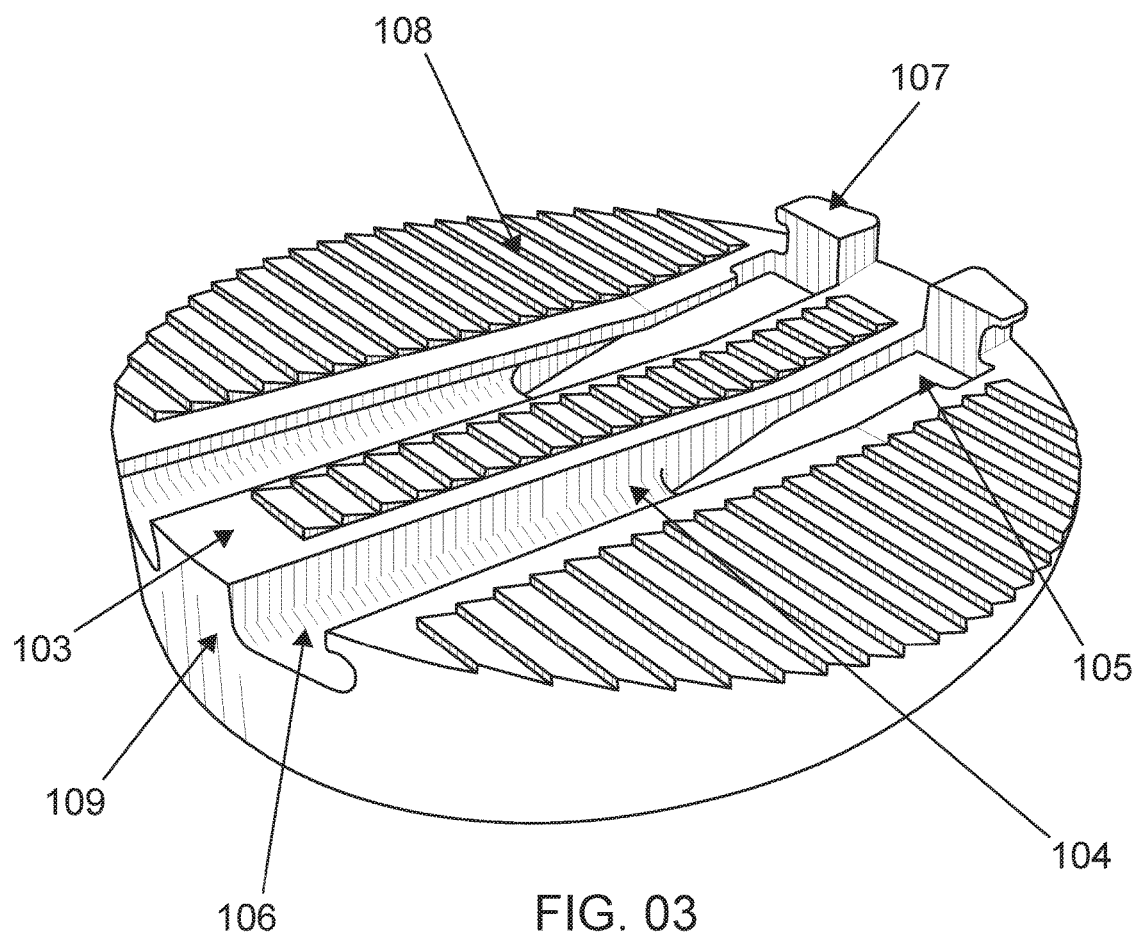
FIG. 03 shows an alternate perspective view of the internal surface of the device, showing the shape of the interlocking channel.
Figure 4:
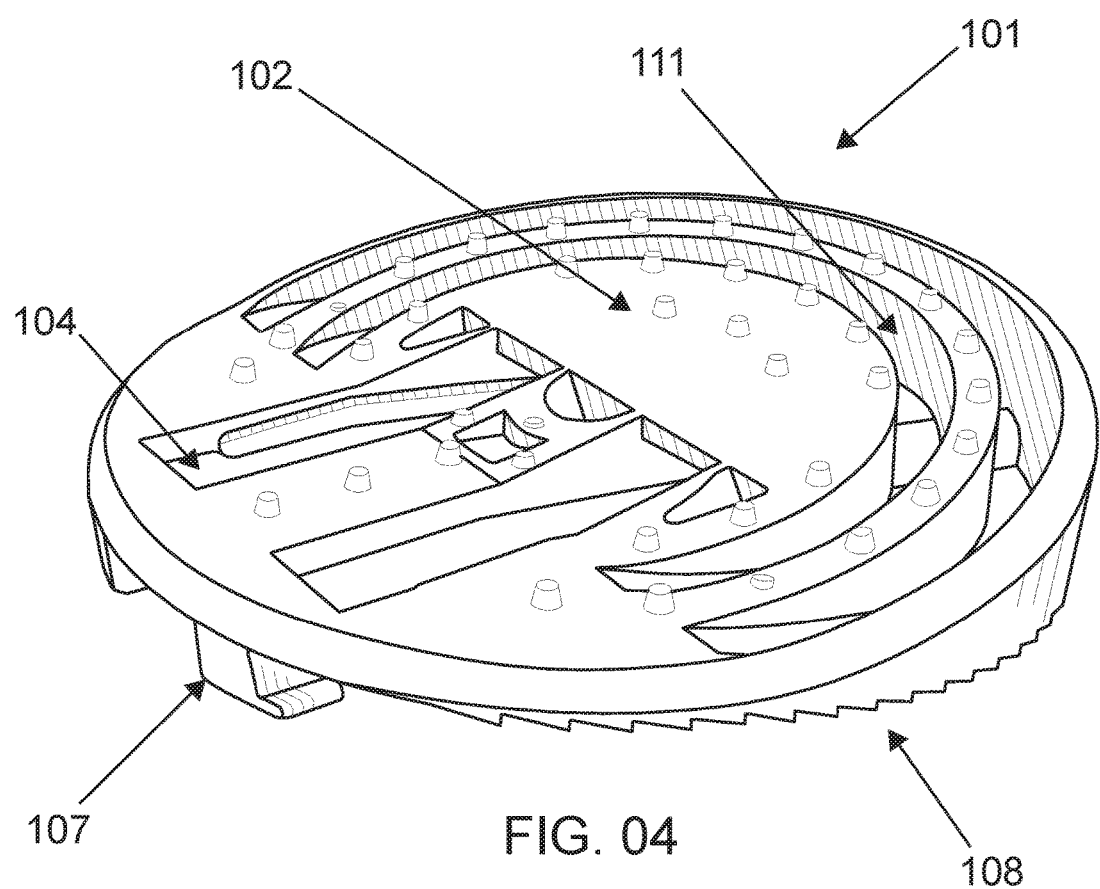
FIG. 04 shows another view of the external surface of the device, showing the grooves to improve traction and flexibility of the device.

FIG. 01 shows an embodiment of the stabilization piece: a stabilization device comprised of two identical pieces, wherein a single piece is depicted in FIG. 01. The stabilization piece comprises of an external surface shown on FIG. 02 and FIG. 04, and an internal surface shown on FIGS. 01 and 03 in greater detail.

The external surface 102 of the piece is ideally made of a grip texture to prevent the pieces from slipping during use. In the preferred embodiment, the grip texture is achieved by having a plurality of raised nubs with the tip of the nubs creating a flat plane to grip the surface it is pressing or supporting against. In FIG. 08A, the external surface holds the piece of the article and grips the surface of the ground so that complete stability is achieved. When weight is applied to the two devices fitted together, the interlocking channel on the stepped ramps, the platform becomes substantially more rigid due to the interlocking nature of the interlocking channels.

The internal surface 103 is comprised of at least one interlocking channel 104, at least one interlocking guide 107, and a stepped ramp 108. The interlocking channel is further comprised of an insertion point 105 and an exit point 106 for the interlocking guide.

The symmetrical nature of the interlocking guide 107, interlocking channel 104, and height adjustment steps 108 that lock down and become substantially more rigid when placed under weight and pressure, which minimizes the risk of the pieces from slipping out of position during use.

The pieces can be assembled together by inserting the interlocking guide 107 of the first piece into the insertion point 105 of the second piece, and by doing so the interlocking guide of the second piece is inserted to the first piece's insertion point as seen in FIG. 07A, with FIG. 07B showing the pieces locked together. Once the two identical pieces are invertably mated together, where both interlocking guides have been inserted into the opposing piece's interlocking channel, the interlocking nature of the pieces allow the pieces to substantially move along an axis parallel with the interlocking channels. The interlocking guides and channels are made in such a way to prevent substantial lateral movements relative to the interlocking channel axis, which may lead into the unwanted scenario of the pieces disengaging from one another and create a potential dislodging of the pieces during use.

To adjust the height of the stabilizer the user can insert the assembled stabilization device FIG. 07B between the ground and the article that needs supporting 110. Then as the user applies force to the pieces along the axis of the interlocking guides, both pieces move along the interlocking channel(s), one step at a time along the stepped ramp 108 until the desired height is achieved, as seen in FIGS. 07A through 07E. Once the adjustable height is achieved between the ground and the article that needs supporting 110, the weight is applied to the interlocking channels and the height adjustment steps lock down as to form a more rigid platform, as shown in FIG. 08B.

If the space that needs to be adjusted is narrower than the height of the two pieces assembled, the user can simply separate the pieces, and insert an individual piece between the ground and the article that needs supporting. It should be noted that interlocking guide 107 can be detached or broken off should a user needs to use a single piece of the stabilization device in order to achieve better stability.

To disassemble the stabilization device, the user can press both pieces together along the interlocking channel(s), pushing both guides along the channel(s) into the respective exit points of both pieces. As the interlocking guides 107 exit the interlocking channel(s) 106, the pieces are disassembled from one another, and can be reused or stored for future use, as seen in FIGS. 07C through 07E. The interlocking guides 107 add additional friction between the pieces and prevent the device from moving backwards and away from the furniture leg should a user need to use a single piece of the stabilization device in order to achieve better stability. Alternatively, the interlocking guides 107 can be broken off should the user desire an even lower setting than the default position.

Furthermore, when assembled; there is approximately a platform in a configuration as shown in FIG. 07A enabling the leveler "at its lowest setting" to slide in a portion of the overall distance of the channel(s) to accommodate various sizes of furniture legs, for example. The devices can be scaled accordingly to different sizes to accommodate heavier pieces of furniture or appliance units.

In the single-interlocking guide version hereby incorporated by reference, the single channel and single guide provides for quick assembly only having to align one track. However, this embodiment with a dual-interlocking guide is strengthened in shear factor and stability; the one side of the interlocking guide is designed to be flat against the internal center wall of the groove (FIG. 07B), and the same interlocking guide's arm interacts with the rail on the opposite side of the same groove guiding both interlocking pins up the groove in unison, further restricting the movement in one direction about the axis of the internal grooves.

The receded position of the interlocking guide(s) permits the leveler to be engaged at the highest setting without disengaging. There is a concave area located on the external surface 102 for the bottom of the furniture leg to sit on, once the platform is engaged with the ramp. The first about one-third of the dual-interlocking guide version allows sliding with the other dual-interlocking guide for about one-third the amount of travel before the leveler starts gaining considerable incremental (with respect to the height adjustment steps 108) height allowing for the sizability of the leveler around the leg of the furniture or table leg, for example. The concentric design and the added pins on their ribs help the leveler grip the floor and the bottom of the furniture leg. As the mated device starts to ramp up where the interlocking guides move along the interlocking channel in an iterative, step-by-step fashion, the device increases in height, and the concave area on the external surface area 102 should be at a point between the insertion points 105 and the rear of the device where commercial logos 109 can be placed.

Figure 5:
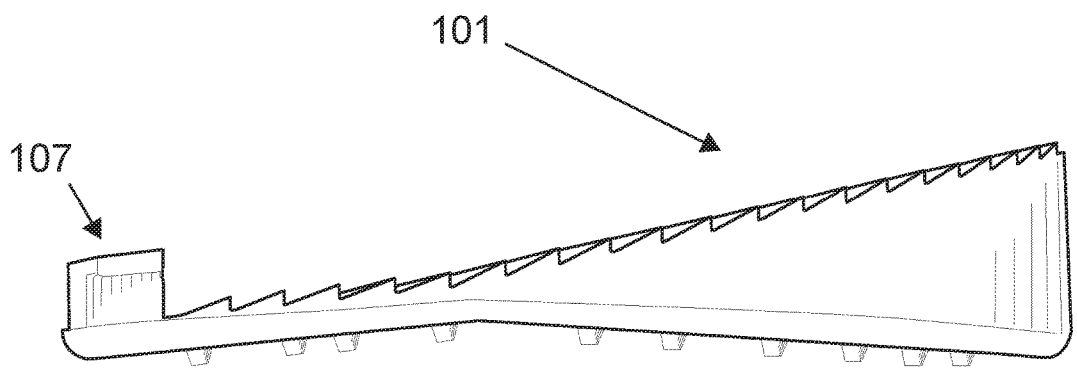
FIGS. 05 and 06 show side profiles of the preferred embodiment of the stabilization device, showing the tapered design of the external surface as opposed to a flat external surface.
Figure 6:
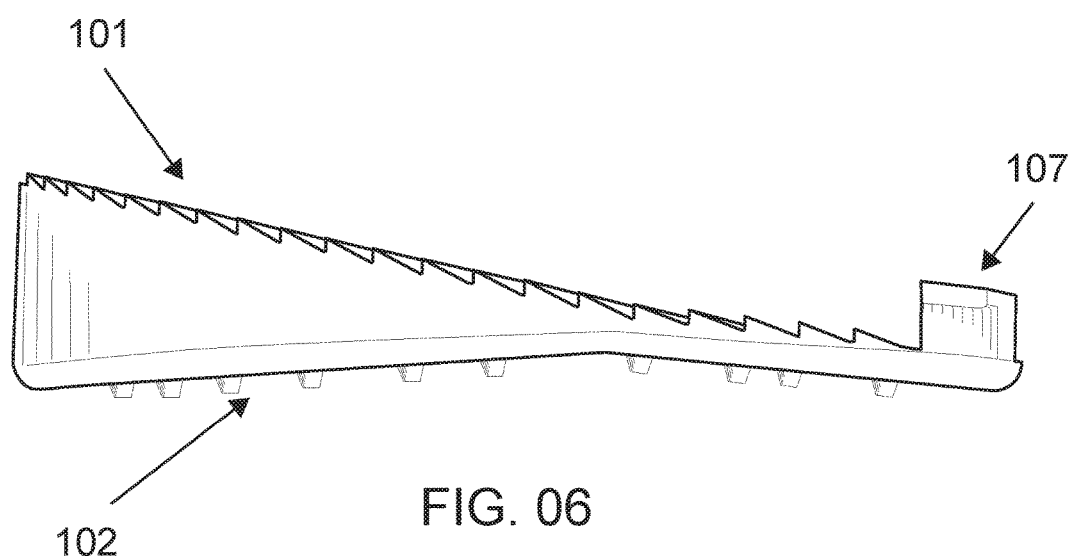

The stabilization piece's external surface is tapered slightly as seen in FIGS. 05 and 06 to assist users when setting the two pieces together prior to use for the purpose of enabling to slide the stabilizing device beneath the 110 bottom' full diameter surface at its lowest configuration as shown in FIG. 07A enabling the leveler "at its lowest setting" to accommodate various sizes of furniture legs, for example. The devices can be scaled accordingly to different sizes.

It should be noted that once the device is set in place, and the weight of the furniture is placed on top of the device as seen in FIG. 08B, the device should be secured and will stay in place due to the weight of the furniture, and any further adjustment to the height of the device would not be possible unless the furniture piece is moved away to free the device.

The stabilizing device can be adorned with commercial logo placements 109 for advertising purposes. A possible use scenario is for business owners to hand these stabilizers to their customers and let the customers adjust and stabilize their seating during busy hours; not only the customers have souvenir that act as advertising material, but the users can practically stabilize their own seating without involving the staff during peak hours allowing the patrons to be a little bit more self-sufficient.

In the Summary above and in the Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Although the present invention has been described in considerable detail with reference to certain preferred versions thereof, other versions are possible. Therefore, the spirit and scope of the appended claims should not be limited to the description of the preferred version contained herein.

The invention claimed is:

1. A height adjustable stabilizing device for insertion between a support plane and an article resting on said support plane, said device comprising of a pair of identical interlocking pieces, wherein each identical interlocking piece comprises:
   a. an external side, said external side having a gripping surface; and
   b. an opposed internal side, said internal side having one interlocking channel located thereon, said channel having an axis, a forward insertion point and a rearward exit point, said internal side also having a plurality of height adjustment ramps located on said internal side surrounding said channel, and at least one interlocking guide located at and in front of said forward insertion point, said interlocking piece increasing in thickness between said external and internal sides from said forward insertion point to said rearward exit point, forming a generally wedge shaped profile;
   c. wherein when two of said interlocking pieces are mated together in an invertably stacked orientation, wherein respective internal sides are mated together, said interlocking guide of a first one of said pieces is mated at said forward insertion point to the interlocking channel of a second one of said pieces and the interlocking guide of the second one of said pieces is mated at said forward insertion point with the interlocking channel of the first one of said pieces, creating said height adjustable stabilizing device; wherein,
   when each of said interlocking guides of said first and second pieces is moved, respectively, along said axis of the other one of said respective interlocking channels, said respective identical interlocking piece external sides are incrementally separated as said respective height adjustable ramps of each of said interlocking pieces bear one against the other.

2. A stabilizing device of claim 1, said stabilizing device further comprising a commercial logo placement.

3. A stabilizing device of claim 1, said gripping surface further comprising a plurality of raised nubs.

4. A stabilizing device of claim 1, wherein when weight is applied to the stabilizing device, the stability of the device increases and resists slippage as the adjustable height ramps of the first one of said pieces press against the adjustable height ramps of the second one of said pieces.

5. A height adjustable stabilizing device for insertion between a support plane and an article resting on said support plane, said device comprising a pair of identical interlocking pieces, wherein each identical interlocking piece comprises:
   an external side, said external side having a gripping surface; and
   an opposed internal side, said internal side having a pair of interlocking channels located thereon, said channels each having an axis, a forward insertion point and a rearward exit point, said internal side also having a plurality of height adjustment ramps located on said internal side surrounding said channels, and a pair of interlocking guides located at and in front of said respective forward insertion points, said interlocking piece increasing in thickness between said external and internal sides from said insertion point to said exit point, forming a generally wedge shaped profile;
   wherein when two of said interlocking pieces are mated together in an invertably stacked orientation, wherein respective internal sides are mated together, said interlocking guides of a first one of said pieces are mated at said insertion points to the interlocking channels, and behind said interlocking guides, of a second one of said pieces and the interlocking guides of the second one of said pieces are mated at said insertion points with the interlocking channels, and behind the interlocking guides, of the first one of said pieces, creating said height adjustable stabilizing device; wherein,
   when each of said interlocking guides of said first and second pieces is moved, respectively, along said axes of the other one of said respective interlocking pieces, said respective identical interlocking piece external sides are incrementally separated as said respective height adjustable ramps of each of said interlocking pieces bear one against the other.

6. A stabilizing device of claim 5, said interlocking stabilizing device further comprising a commercial logo placement.

7. A stabilizing device of claim 5, said gripping surface further comprising a plurality of raised nubs.

8. A stabilizing device of claim 5, wherein when weight is applied to the interlocking stabilizing device, the stability of the device increases and resists slippage as the adjustable height ramps of the first one of said pieces press against the adjustable height ramps of the second one of said pieces.

\* \* \* \* \*